US006507020B2

(12) United States Patent
Shiokawa et al.

(10) Patent No.: US 6,507,020 B2
(45) Date of Patent: Jan. 14, 2003

(54) HALIDE COMPOUND MASS SPECTROMETRY METHOD AND MASS SPECTROMETRY APPARATUS

(75) Inventors: Yoshiro Shiokawa, Tokyo (JP); Toshihiro Fujii, Tokyo (JP)

(73) Assignee: Anelva Corporation, Tokyo (JP)

( * ) Notice: Subject to any disclaimer, the term of this patent is extended or adjusted under 35 U.S.C. 154(b) by 216 days.

(21) Appl. No.: 09/736,331

(22) Filed: Dec. 15, 2000

(65) Prior Publication Data

US 2001/0004102 A1 Jun. 21, 2001

(30) Foreign Application Priority Data

Dec. 15, 1999 (JP) .......................................... 11-356725

(51) Int. Cl.[7] .......................... H01J 49/26; B01D 59/44

(52) U.S. Cl. ....................... 250/288; 250/282; 250/281; 423/489; 423/490; 423/491; 423/495; 423/496; 423/497

(58) Field of Search ................................ 250/288, 282, 250/281; 423/489, 490, 491, 495, 496, 497

(56) References Cited

FOREIGN PATENT DOCUMENTS

| | | |
|---|---|---|
| JP | A 1-255146 | 10/1989 |
| JP | A 6-011485 | 1/1994 |

OTHER PUBLICATIONS

R.V. Hodges et al., "Application of Alkali Ions in Chemical Ionization Mass Spectrometry", Analytical Chemistry, vol. 48, No. 6, May 1976, pp. 825–829.

D. Bombick et al., "Potassium Ion Chemical Ionization and Other Uses of an Alkali Thermionic Emitter in Mass Spectrometry," Analytical Chemistry, vol. 56, No. 3, 1984 pp. 396–402.

T. Fujii, "Quadrupole Mass Spectrometry in Combination with Lithium Ion Attachment for Sampling at Atmospheric Pressure: Possible Coupling to Supercritical Fluid Chromatography", Analytical Chemistry, vol. 64, No. 7, 1992 pp. 775–778.

T. Fujii et al., "Chemical Ionization Mass Spectrometry with Lithium Ion Attachment to the Molecule", Analytical Chemistry, vol. 61, No. 9, 1989 pp. 1026–1029.

T. Fujii, "A novel method for detection of radical species in the gas phase: usage of $Li^+$ ion attachment to chemical species", Chemical Physics Letter, vol. 191, No. 1, 2, Mar. 1992, pp. 162–168.

(List continued on next page.)

*Primary Examiner*—Bruce Anderson
*Assistant Examiner*—Nikita Wells
(74) *Attorney, Agent, or Firm*—Oliff & Berridge, PLC

(57) ABSTRACT

A mass spectrometry apparatus is provided with an emitter for emitting metal ions, a reaction chamber where the detected gas is introduced and ionized by the metal ions, an aperture for guiding molecules of the ionized detected gas, and a mass spectrometer for measuring the guided molecules. The metal ions emitted from the emitter are caused to fly to the reaction chamber to ionize said detected gas. The detected gas is a halide compound. Further provision is made of a sample gas source for feeding a halide compound to the reaction chamber and an $N_2$ gas source for feeding to the reaction chamber a gas ($N_2$ etc.) to which the metal ions attach less easily than to the halide compound. It is therefore made possible to apply cation attachment of the Fujii system to mass spectrometry of a halide compound and enable precise measurement of fluoride compounds etc. having a large impact on global warming.

18 Claims, 4 Drawing Sheets

OTHER PUBLICATIONS

K. Tachibana, "Diagnostics of polymerized species in processing plasmas by electron attachment mass spectrometry", Oyo Butsuri (Applied Physics), vol. 68, No. 10, (1999) pp. 1148–1152.

E. Stoffles et al., "Electron attachment mass spectrometry as a diagnostics for electronegative gases and plasmas", Review of Scientific Instruments, vol. 69, No. 1, Jan. 1998, pp. 116–122.

T. Fujii, "Neutral product analysis of the microwave $C_2H_2$ plasma: $C_n$, $C_nH_2$, $C_nH_3$, $C_nH_4$, $C_nH_5$, and larger species", Journal of Applied Physics, vol. 82, No. 5, Sep. 1997, pp. 2056–2059.

HALIDE COMPOUND MASS SPECTROMETRY METHOD AND MASS SPECTROMETRY APPARATUS

BACKGROUND OF THE INVENTION

1. Field of the Invention

The present invention relates to a mass spectrometry method and a mass spectrometry apparatus for d halide compound, and more particularly relates to a mass spectrometry method and a mass spectrometry apparatus for a halide compound using soft ionization utilizing ion attachment in ionizing the halide compound for the purpose of mass spectrometry.

2. Description of the Related Art $CF_4$, $C_4F_6$, and other perfluoro compounds (PFC), $CH_3$ and other hydrofluorocarbons (HFC), and $SF_3$, $NF_3$ and other gases are utilized in various industries. These fluoride compounds are extremely stable, but have an extremely large effect on global warming. There have therefore been calls for reducing the amount of their emission on a global scale. In particular, in semiconductor and electronic component manufacturing facilities, gases are inevitably being discomposed and emitted Therefore, emphasis is currently being placed on precisely measuring what types of ingredients of the gases are being emitted in exactly what amounts.

In the past, the general practice had been to use mass spectrometry for measuring the ingredients and amounts of gas. Mass spectrometry measures the mass of the gas (or molecular weight) to identify the ingredients of the gas and measure the amount of the gas. In mass spectrometry, a positive charge or negative charge is given to the neutral gas molecules to Ionize them, then the gas molecules are led into a specific electrical field or magnetic field space and the electrical force or magnetic force applied to the ions is changed to obtain a mass spectrum with mass as its abscissa and the amount of tons as its ordinate. For this mass spectrometry, there have conventionally been several methods in accordance with the means of ionization used, that is, (1) the method of utilizing electron impact, (2) the method of utilizing electron attachment, and (3) the method of utilizing cation (positive ion) attachment. These mass spectrometry methods will be explained in brief below and their problems are pointed out.

(1) Electron Impact Mass Spectrometry:

In a mass spectrometry method utilizing electron impact (EI), electrons having an energy of, for example, 50 to 100 eV or so are made to collide with gas molecules to strip electrons from the gas molecules and convert the gas molecules to positive ions. This Is the most generally used method because the hardware is simple.

(2) Electron Attachment Mass Spectrometry;

This mass spectrometry method has been developed in recent years and uses the action of electron attachment (EA). That is, electrons having a low energy of not more than 10 eV are made to attach to the gas molecules to give the gas molecules a negative charge as a whole and ionize them. This method has the advantage of involving less excess energy and resulting in less dissociation compared with electron impact. The method was developed with the intent of precise mass spectrometry of fluoride compounds. As a technical reference of the related art, *Oyo Butsuri* (*Applied Physics*). vol. 68. no. 10, p. 1148 (1999) and *Review of Scientific Instruments*, vol. 69, no. 1., p. 116 (1998) may be mentioned.

(3) Cation Attachment Mass Spectrometry

This mass spectrometry method causes cations (or positive ions) to be attached to the gas molecules for ionization Instead of the afore-mentioned electron attachment. This method has been in existence for a comparatively long time, therefore has been mainly used in the field of organic spectrometry. The method alms at precise mass spectrometry of gas molecules without causing dissociation. The method of using positive charge metal ions of an alkali metal is effective. In practice, the efficacy has been confirmed for hydrocarbons with small electron affinity. Up until now, various systems have been proposed by Hodge, Bombick, Fujii, etc. These systems will be explained in brief next.

The Hodge system is described in *Analytical Chemistry*, vol. 48, no. 6. p. 825 (1976). The system proposed by Hodge utilizes $Li^+$ as the alkali metal ions. $Li^+$ is generated by heating an emitter including an Li oxide. The $Li^+$ generated from the emitter moves to the flight region, then is guided to the reaction chamber containing the gas molecules to be detected. Therefore, the emitter is placed in a region outside the reaction chamber. The ionization is performed in the reaction chamber. The gas molecules with the $Li^+$ attached as a result of the ionization are withdrawn from the reaction chamber and transported to a quadrapole mass spectrometer for mass spectrometry. This system is an indirect attachment method which causes $Li^+$ to be attached to the gas molecules being detected. It is said that direct attachment is difficult with this system. In indirect attachment. the $Li^+$ is first attached to a reaction gas, then the $Li^+$ is moved from the reaction gas, with the $Li^+$ to the gas being detected. In direct attachment. the $Li^+$ is attached directly to the gas molecules being detected without interposition of a reaction gas. The above reference gives working data to explain the indirect attachment in the above way. The reasons given are that there is little difference in the sensitivity by the detected gas (ease of attachment of cations) and there Is little dissociation. As opposed to this, it indicates that when using direct attachment, dissociation occurs when the detected gas is a fluoride compound etc. so, direct attachment is difficult. In the above configuration, a large amount of reaction gas (isobutane or other hydrocarbon) is introduced into the reaction chamber.

The system of Bombick is described in *Analytical Chemistry*, vol. 56, no. 3, p. 396 (1984). The system proposed by Bombick utilizes K+ as the alkali metal ions. An emitter containing potassium (K) oxide is placed in the reaction chamber. Only the gas being detected is introduced into the reaction chamber. No other reaction gas is introduced. Therefore, the K+ released from the emitter in the reaction chamber directly attaches to the molecules of the detected gas. That is, the system of Bombick is a direct attachment system.

Problems in Electron Impact Mass Spectrometry:

In this method, the electron impact is a physical action, so a high energy is given to the detected gas. Therefore, if electron impact is used for gas molecules of a fluoride compound or other halide compound, since the binding energy of atoms in the gas molecules is usually small, the excess energy of the electron impact will cause the gas molecules to dissociate into fragments along with the ionization. Therefore, the peak due to the gas molecules not dissociating in the mass spectrum is called the molecule peak (or parent peak), while the peaks of the dissociated fragments are called the fragment peaks. With molecules with large number of atoms such as the above halide compounds, however, fragment peaks appear due to dissociation and the inherent molecule peak cannot be discerned well at all. FIG. 4 shows an example of a mass spectrum obtained by ionization of molecules of a fluoride compound, that is. $C_4F_8$, by electron impact by an electron energy of 70 eV. In FIG. 4, the abscissa indicates the mass, while the ordinate indicates the amount of ions. The mass of the $C_4F_8$ molecule is 200 amu (atomic molecular units), but the molecule peak does not appear much at all in the mass spectrum. Only the fragment peaks of $C_3F_5$, $C_2F_4$, CF, etc. appear. In the past, the practice had been to deduce the inherent molecule peak, that is, the mass and amount of the molecules, based on the state of appearance of these fragment peaks. In this way, precise mass spectrometry of a halide compound was difficult with mass spectrometry using electron impact.

Problems in Electron Attachment Mass Spectrometry:

This method has currently reached a level of measurement sensitivity practical for halide compounds. Compared with the method of utilizing electron impact, there is Indeed less dissociation. Even so, however, it is not possible to sufficiently suppress dissociation. Even with electron attachment mass spectrometry, precise mass spectrometry of a halide compound is difficult.

Problems in Cation Attachment Spectrometry

This method, as explained above, includes various systems such as the Hodge system, Bombick system, and Fujii system. The Hodge system is an indirect attachment method as shown in the working data. In the case of the Hodge system, direct attachment does not allow precise measurement of the molecule peak of the gas molecules being detected, because, if using a fluoride compound, dissociation occurs along with the $Li^+$ attachment and the $Li^+$ only attaches to the fragments after dissociation. Further, in the Bombick system, when the potential of the emitter becomes higher (more than 5V), dissociation occurs due to the reaction of the detected gas. Further, the concentration of the detection gas becomes high, so the problem arises of the molecules of the detected gas easily bonding together and forming clusters. In addition, there is the problem of emitter damage, that is, the problem of the emitter suffering large damage due to the active fragments dissociated at the surface of the emitter. Among the above systems, the Fujii system has the advantage in structure of eliminating the above problems relating to cation attachment mass spectrometry and enables precise measurement of hydrocarbons and their radicals and other unstable molecules. Further, the Fujii system is being improved and applied to inventions for ion attachment in atmospheric reaction chambers (Japanese Examined Patent Publication (Kokoku) No 7-48371), inventions for attaching Ions to neutral active species (Japanese Unexamined Patent Publication (Kokai) No. 6-11485), etc. As explained above, however, the cation attachment method of the Fujii system is not currently being applied to mass spectrometry for measuring the amount of emission of halide compounds, Including fluoride compounds, having a large impact on global warming.

SUMMARY OF THE INVENTION

An object of the present invention is to provide a mass spectrometry method and mass spectrometry apparatus for a halide compound which apply cation attachment of the Fujii system to mass spectrometry of a halide compound and enable precise measurement of fluoride compounds etc. having a large impact on global warming.

The mass spectrometry method and mass spectrometry apparatus of a halide compound according to the present Invention are configured as follows to achieve the above object. Below, first, the principle of the present invention will be explained, then the means of the invention and action of the same will be explained.

Principle of Invention: p The fact that electrons easily attach to fluoride compounds (large electron affinity) has been well known in the past. Therefore, electron attachment mass spectrometry had been applied to actual measurement of fluoride compounds. At the same time, the general belief had been the vague "positive charges or cations do not attach easily to fluoride compounds to which negative charges or electrons easily attach". This had been the conventional belief judging from the fact that there is overwhelmingly less $F^+$ compared with the negative ions F. Therefore, most persons involved in the mass spectrometry method had not even imagined applying the cation attachment mass spectrometry method to fluoride compounds.

The present Inventor, however, engaged in a careful study and as a result predicted that cation attachment mass spectrometry could be applied to fluoride compounds. A precise explanation of the applicability should be made from the results of theoretical calculations by a supercomputer. Very simply, however, it can be said that, since the distribution of electrons of the compound is lopsided, positive charges easily attach to the side opposite to where the negative charges easily attach. That is, the ease of attachment of the cations is determined by the lopsided distribution of electrons and is not inversely proportional to the ease of attachment of the electrons. Therefore, It is, predicted that cations will sufficiently attach to even fluoride compounds to which electrons easily attach.

Further, as clear from the above Hodge reference, it has been suggested that, basically, cation attachment mass spectrometry can be applied to a fluoride compound. In this case, however, as explained above, it had been understood that application was difficult because dissociation would occur when direct attachment was applied to a fluoride compound, and that indirect attachment using a reaction gas would be more practicable.

As opposed to this, the present inventor did not believe that dissociation of the fluoride compound in the direct attachment method was in principle an unavoidable phenomenon. The reasons were as follows.

In the Hodge system, the pressure of the region of placement of the emitter is a low $10^3$ Pa, so the $Li^+$ produced from the emitter flies without absorption of energy by the atmospheric gas (reduction of translational energy). Further, the pressure of the reaction chamber is a somewhat high 1.3 Pa, but the mean free path at that pressure is about 5 mm and almost no absorption of energy by collisions can be expected. Therefore, the $Li^+$ collides with the detected gas at a high energy of 1 to 2 eV and dissociation easily occurs. Incidentally, due to the high energy impact, the probability of not again separating after impact (attachment efficiency) is also considerably degraded.

Further, excess energy is produced in the molecules after attachment of $Li^+$. Due to the attachment of $Li^+$, the molecules as a whole stabilize in terms of energy. That is, the internal energy becomes low. The difference In internal energy before and after attachment is the excess energy. This causes dissociation. In particular, this excess energy is large In direct attachment. Further, in the Hodge system, the pressure of the reaction chamber is an insufficiently high 1.3 Pa, so excess energy remains in the molecules without being dispersed and absorbed by the atmospheric gas and causes dissociation.

That is, the present inventor judged that dissociation occurs in fluoride compounds etc. by the direct attachment of the Hodge system since the pressure in the region of placement of the emitter and the reaction chamber is not sufficiently high. Therefore, the present inventor judged that by making the pressure of the region of placement of the emitter and the reaction chamber sufficiently high, the translational energy of the $Li^+$ in the region of placement of the emitter can be reduced and the excess energy of the $Li^+$ attached detected gas can be dispersed and accordingly fluoride compounds can be measured without dissociation. Making the pressure of the region of placement of the emitter and the reaction chamber sufficiently high was predicted to be substantially Identical to the cation attachment mass spectrometry of the Fujii system.

Therefore, the present inventor conducted the following experiment to confirm the prediction that the Fujii system cation attachment mass spectrometry can be applied to a fluoride compound. The detected gas was made the representative PFC (perfluoro compound) of $C_4F_n$, the cations were made $Li^+$ , the pressure of the reaction chamber was made 133 Pa, and the inert gas was made $N_2$. The hardware configuration will be explained in the second embodiment. As a result of the measurement test, as shown in the mass spectrum of FIG. 3, peaks only appeared at the 207 amu of $C_4F_nLi^+$, 35 amu of $N_2Li^+$ corresponding to the molecule peak of $N_2$, 25 amu of $H_2OLi^+$ corresponding to the molecule peak of $H_2O$ included In the gas as an impurity, and 7 amu of unattached $Li^+$. No fragment peaks at all appeared. That is, it was confirmed that the mass of the gas molecules of the detected gas was precisely measured without the occurrence of dissociation even when using cation attachment mass spectrometry for a fluoride compound. Note that 133 amu is the Cs impurity included In the emitter itself. Note further that making the pressure of the region of placement of the emitter and the reaction chamber higher is a preferable condition, but is not an essential condition when considering future advances. For example, if electrically giving conditions assisting the reaction, it may be possible to perform the mass spectrometry by cation attachment to a fluoride compound under relatively low pressure conditions.

Configuration of Invention:

A mass spectrometry method for a halide compound according to the present invention is configured as follows.

The mass spectrometry method is a method comprising ionizing a detected gas and then utilizing electromagnetic force to measure the mass of the molecules of the detected gas. The detected gas is a halide compound. Positive charge metal ions are attached directly on the halide compound to ionize it. According to this mass spectrometry method, the technique for mass spectrometry of a fluorine compound or other halide compound comprises directly and softly attaching positive charge metal ions on the halide compound, then transporting the molecules of the halide compound with the metal ions to a quadrapole mass spectrometer to measure the same, so it is possible to directly observe the molecule peaks in the mass spectrum without causing dissociation.

In the above mass spectrometry method, preferably the main component in the atmosphere of the reaction region for the ionization is a gas to which metal ions attach less easily than to the halide compound. By making a gas to which the metal Ions attach less easily the main component in the reaction region, metal ions attach directly more easily on the halide compound of the sample gas.

In the mass spectrometry method, preferably the main component is a gas selected from any of He, Ar, Ne, $H_2$, and $N_2$, As the gas to which the metal ions attach less easily, a stable inert gas is used.

In the above mass spectrometry methods, preferably a pressure of an atmosphere of at least the reaction region is maintained at a predetermined high pressure by the gas forming the main component. To set the pressure of the atmosphere of the reaction region high, as explained in the principle of the invention as well, is a preferable condition from the viewpoint of the prevention of dissociation when attaching ions on a halide compound by direct attachment. As explained earlier, however, there is a possibility that the pressure can be lowered as well, so this cannot be said to necessarily be a necessary condition.

In the above mass spectrometry methods, preferably the pressure of the atmosphere of the reaction region is at least 10 Pa, more preferably at least 100 Pa.

In the above mass spectrometry methods, preferably the pressure of the atmosphere of a region wherein the metal ions fly until entering the reaction region Is at least 10 Pa. In making the pressure of the atmosphere of the reaction region high, the pressure of the atmosphere of the metal ion flight region between the emitter emitting the metal ions and the reaction region is preferably also made higher.

In these mass spectrometry methods, preferably the halide compound includes a carbon atom and a fluorine atom.

In these mass spectrometry methods, preferably the metal ion is any of Li, K, Na, Rb, Cs, Al, Ga, and In.

Further, the mass spectrometry apparatus for a halide compound according to the present invention is configured as follows.

This mass spectrometry apparatus is provided with an emitter for emitting metal ions, a reaction chamber where the detected gas Is Introduced and ionized by the metal ions, an electromagnetic guide (aperture, condensing lens, etc.) for guiding molecules of the ionized detected gas, and a mass spectrometer for measuring the molecules guided by the guide (quadrapole mass spectrometer etc.) and causes the metal ions emitted from the emitter to fly to the reaction chamber to ionize the detected gas. Further, the detected gas is a halide compound and further provision is made of a first gas source (sample gas source) for feeding a halide compound to the reaction chamber and a second gas source for feeding to the reaction chamber a gas to which the metal ions attach less easily than to the halide compound ($N_2$ gas source).

According to the apparatus of the above configuration, it is possible to work the mass spectrometry method of a halide compound according to the present invention and possible to apply the cation attachment method to mass spectrometry of a halide compound and thereby accurately measure a fluoride compound etc.

In the mass spectrometry apparatus, preferably the gas to which the metal Ions attach less easily is any of He, Ar, Ne, $H_2$, and $N_2$. As the gas to which the metal ions attach less easily, an inert gas having stable properties Is preferred.

In the mass spectrometry apparatus, preferably further provision is made of a pressure adjusting means for adjusting an internal pressure of the reaction chamber to a predetermined high pressure and the internal pressure of the reaction chamber is held at the predetermined high pressure by the pressure adjusting means. By setting such pressure conditions, it becomes easy to make metal ions directly attach on the molecules of the halide compound, dissociation etc. is prevented, and a practical apparatus is obtained.

In the mass spectrometry apparatus, preferably the internal pressure of the reaction chamber is at least 10 Pa. As the above high pressure, at least 10 Pa is preferable and at least 100 Pa is more preferable.

The mass spectrometry apparatus preferably feeds the gas from the second gas source also to a region where the metal ions fly until striking the reaction region and sets the pressure of the region to at least 10 Pa.

The mass spectrometry apparatus preferably does not provide the reaction chamber as a separate part but configures it using as common regions a region of placement of the emitter, the flight region, and a reaction region corresponding to the reaction chamber. Since the reaction chamber can be eliminated, the configuration becomes simpler and the manufacturing cost can be reduced.

In the mass spectrometry apparatus, preferably the halide compound Includes a carbon atom and a fluorine atom.

In the mass spectrometry apparatus, preferably the metal ion is any of Li, K, Na, Rb, Cs, Al, Ga, and In.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained next with reference to the attached drawings.

Figure 1:
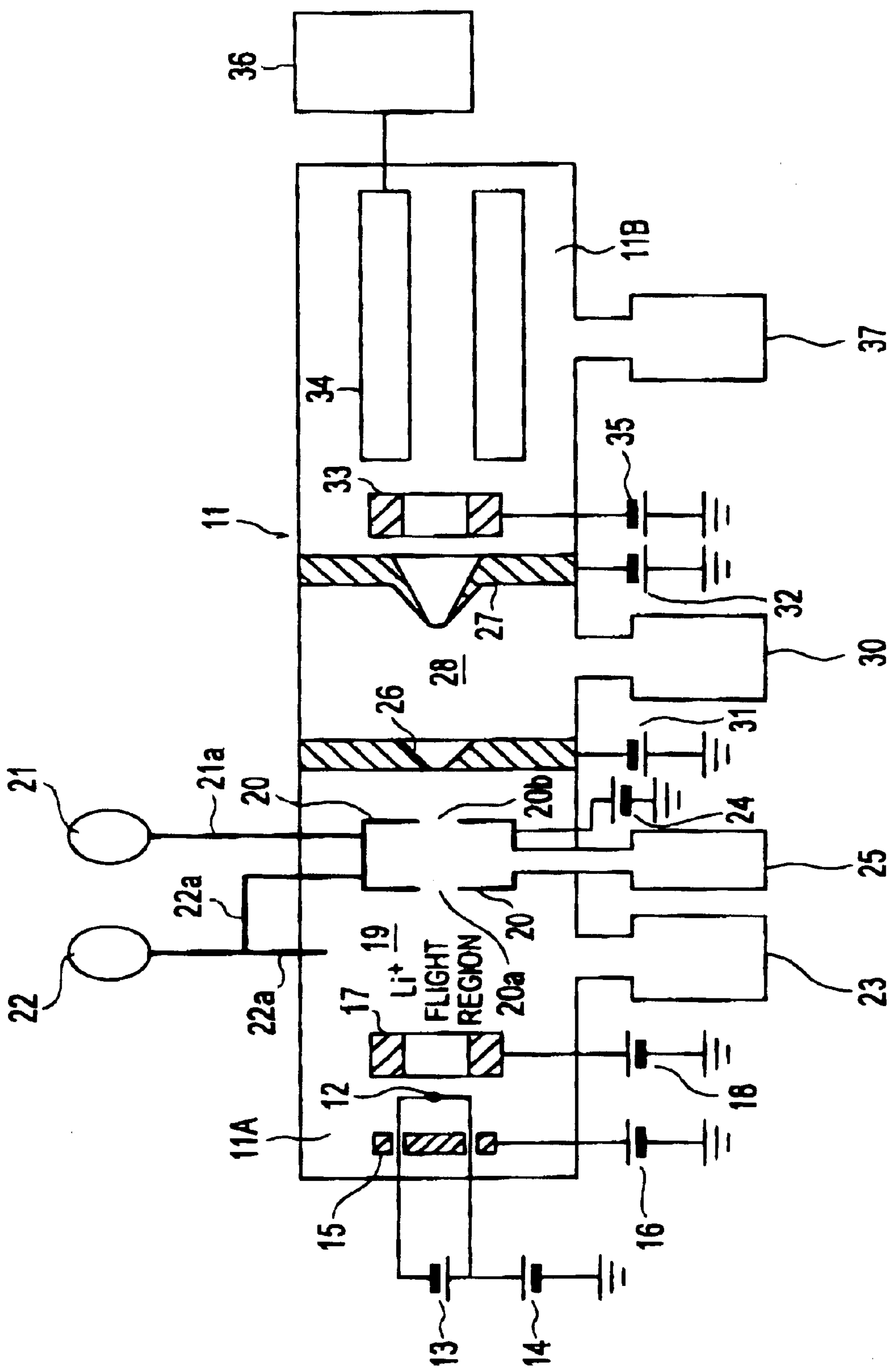
FIG. 1 is a view of the configuration of a first embodiment of the present invention.

FIG. 1 shows a mass spectrometry apparatus according to a first embodiment of the present invention. The mass spectrometry apparatus of the first embodiment is configured with the emitter portion and reaction chamber separate.

First, the configuration will be explained. In FIG. 1, an emitter 12 including an Li oxide is for example provided at the left end of the inside of the apparatus housing 11. An emitter heating control power source 13 and an emitter potential control power source 14 are attached to the emitter 12. A repeller 15 is placed behind the emitter 12. A repeller potential control power source 16 is attached to the repeller 15. An emitter lens 17 is placed in the emitter front space located to the right of the emitter 12. A lens potential control power source 18 is similarly attached to the emitter lens 17. An $Li^+$ flight region 19 is provided at the right of the emitter lens 17. Further, a reaction chamber 20 is provided. Therefore, in the mass spectrometry apparatus, the region of placement of the emitter 12 and the reaction chamber 20 are separated. The reaction chamber 20 is provided to form an isolated reaction space in the left inside space 11A of the apparatus housing. The left inside space 11A contains the emitter placement region and the $Li^+$ flight region 19. In the reaction chamber 20 are formed an emitter side wall and the opposite side wall and also n $Li^+$ inlet 20*a* and outlet 20 for withdrawing the $Li^+$ attached gas molecules respectively. Further, in the reaction chamber 20, a sample gas source 21 and $N_2$ gas source 22 are connected by piping 21*a* and 22*a*. The sample gas source 21 feeds the detected gas of the halide compound as a sample gas through the piping 21*a* to the reaction chamber 20. The $N_2$ gas source 22 feeds $N_2$ gas through the piping 22*a* to the $Li^+$ flight region 19 as well. Note that while $N_2$ gas was used as the Inert gas introduced into the reaction chamber 20, the present invention is not limited to this.

In the above configuration, a vacuum pump 23 is provided at the left internal space 11A (in particular, the $Li^+$ flight region 19) so as to evacuate that space to a predetermined pressure, while the reaction chamber 20 is provided with a potental control power source 24 and a vacuum pump 25 for evacuating the internal pressure to a predetermined pressure.

At the right of the reaction chamber 20 in FIG. 1 are provided a first aperture 26 and a second aperture 27. The first aperture 26 and the second aperture 27 are arranged separated by a required distance. A space (region) 28 is formed between the two. A vacuum pump 30 is attached for evacuating this space 28. Further, potential control power sources 31 and 32 are provided at the first and second apertures 26 and 27.

At the right of the second aperture 27 is placed a quadrapole mass spectrometer 34. A condensing lens potential control power source 35 is attached to the condensing lens 33, while a quadrapole mass spectrometer control power source 36 is attached to the quadrapole mass spectrometer 34. A vacuum pump 37 is attached for evacuating the space 11B from the second aperture 27 to the quadrapole mass spectrometer 34.

Next, the operating conditions and actions of the above hardware will be explained, $Li^+$ ionized by a surface electrolytic action Is directly emitted from the emitter 12 heated to about 600 C by the emitter heating control power source 13. The $Li^+$ flies through the $Li^+$ flight region 19 toward the reaction chamber 20 based on the electrical field determined by four potentials, that is, (1) the potential of the emitter 12 applied from the emitter potential control power source 14, (2) the potential of the repeller 15 applied from the repeller potential control power source 16, (3) the potential of the emitter lens 17 applied from the emitter lens potential control power source 18, and (4) the potential of the reaction chamber 20 applied from the reaction chamber potential control power source 24.

The distance in the axial direction of the apparatus housing 11 In the $Li^+$ flight region 19 constituted between the emitter 12 and the reaction chamber 20 is for example about 70 mm. The potential of the emitter 12 is for example 160V, while the potential of the reaction chamber 20 is for example 60V. The pressure in the $Li^+$ flight region 19 is determined by the flow rate of the $N_2$ gas introduced through the piping 22*a* for introducing $N_2$ gas from the $N_2$ gas source 22 to the $Li^+$ flight region 19 and the pumping speed of the vacuum pump 23 evacuating the $Li^+$ flight region 19 and is set to at least 10 Pa, preferably at least 100 Pa. In this embodiment, it is adjusted to for example about 100 Pa.

At a pressure of 100 Pa, the mean free path in which the ions can proceed without colliding with the $N_2$ of the atmospheric gas is about 70 $\mu$m. Therefore, while the $Li^+$ is flying from the emitter 12 to the reaction chamber 20, the $Li^+$ collides with the $N_2$ as much as 1000 times (=70 mm/70 $\mu$m). If the $Li^+$ collides with the $N_2$, seen overall, the $Li^{30}$ may lose its translational energy and stop. Therefore, the $Li^+$ repeatedly progresses and stops for every 70 $\mu$m 1000 times. That is, the translational energy when the $Li^+$ collides with the $N_2$ only becomes a slight 0.1 eV ((160V−60V)/1000) even at the maximum.

The potentials of the repeller 15 and the emitter lens 17 are for example made 150V and 50V, respectively. These are adjusted to as to concentrate the $Li^+$ and drive as much $Li^+$ as possible into the reaction chamber 20. These do not have any effect on the translational energy in the axial direction, so have almost nothing to do with the collision energy of the $Li^+$.

The thickness (width) of the reaction chamber 20 in the axial direction is about 10 mm. The pressure in the pressure chamber 20 is determined by the flow rates of the sample gas and $N_2$ gas fed from the sample gas source 21 and the N2 gas source 22 to the reaction chamber 20, respectively, and the pumping speed of the vacuum pump 25 evacuating the reaction chamber 20. The internal pressure of the reaction chamber 20 is set to at least 10 Pa, preferably at least 100 Pa. In this embodiment, it is for example adjusted to about 133 Pa. Further, the concentration of the detected gas to the $N_2$ gas in the reaction chamber is preferably adjusted to about 0.1% by adjusting the ratio of the flow rates of the sample gas and the $N_2$ gas.

The $Li^+$ driven into the reaction chamber 20 only has a low translational energy of 0.1 eV at the most. Also, there is no strong electrical field in the reaction chamber 20. Due to this, the motion of the $Li^+$ in the reaction chamber mainly becomes random motion due to heat. Therefore, the $Li^+$ repeatedly collides an extremely large number of times with the $N_2$ gas or the detected gas. One $Li^+$ ion collides as much as $10^7$ times with the main $N_2$ gas and as much as $10^4$ times with the 0.1% concentration detected gas. Further, the mean collision energy is only 0.04 eV due to the heat energy according to the kinetics of gas molecules. With such collisions, the $Li^+$ will attach efficiently to the detected gas and will not cause dissociation at the time of collision.

The $Li^+$ attached detected gas has excess energy due to the internal energy difference. If this is left alone, dissociation will occur. Hwoever, the $Li^+$ attached detected gas repeatedly collides with the large number of $N_2$ gas atoms at a low energy, so the $N_2$ gas absorbs the energy and the excess energy of the $Li^+$ attached detected gas is dispersed. Due to this the $Li^+$ attached detected gas becomes stable and can stand without dissociation.

The stablized $Li^+$ attached detected gas is withdrawn from the reaction chamber 20 by being drawn by the potential of the first aperture 26 applied from the first aperture potential control power source 31 and flies toward the first aperture 26. The distance in the axial direction between the reaction chamber 20 and the first aperture 26 is for example about 30 mm. The potential of the first aperture 26 becomes for example 10V. The $Li^+$ attached detected gas proceeds while colliding with the $N_2$ gas by a low energy of about 0.1 eV in the same way as the $Li^+$ at the $Li^+$ flight region, but no dissociation or separation of the $Li^+$ occurs with such a degree of energy.

Near the hole of the first aperture 26 (emitter side), the $N_2$ gas etc. flows in the direction of the low pressure second aperture 27. Therefore, the $Li^+$ attached detected gas which had flown up to close to the hole of the first aperture 26 is entrained in this flow and passes through the hole of the first aperture 26 to reach the region (space 28) between the first aperture 26 and the second aperture 27. Next, the $Li^+$ attached detected gas flies toward the second aperture 27 due to the electrical field determined by the potentials of the first aperture 26 and the second aperture 27.

The distance in the axial direction between the first aperture 26 and the second aperture 27 is for example 20 mm and the potential of the second aperture is −100V. The pressure in the space 28 between the first aperture 26 and the second aperture 27 is determined by the flow rate from the hole of the first aperture 26 and the pumping speed of the vacuum pump 30 evacuating the space 28 and is generally designed to become not more than $10^{-1}$ Pa. The mean free path at $10^{-1}$ Pa becomes about 70 mm, so the $Li^+$ attached detected gas reaches the second aperture 28 by a translational energy of 110 eV (=10−(−100) eV) without striking the atmospheric gas.

The $Li^+$ attached detected gas moving entrained in the flow of the gas near the hole of the first aperture 26 moves due to only the electrical field irregardless of the flow of the gas after the first aperture 26. That is, the movement of the $Li^+$ attached detected gas after the first aperture 26 becomes substantially the same as the mass spectrometer of the ordinary EI method. The $Li^+$ attached detected gas passes through the second aperture 27, then is condensed by the condensing lens 33 controlled by the condensing lens potential control power source 35 and is transported to the quadrapole mass spectrometer 34. The quadrapole mass spectrometer 34 is controlled by the quadrapole mass spectrometer control power source 36 and then the sample gas including the $Li^+$ attached detected gas is analyzed.

The fact that there is no collision with the gas after the first aperture 26 means that even if there is a change In the potential in the intermediate region, the translational energy finally striking the quadrapole mass spectrometer 34 will be equal to the translational energy when the gas leaves the first aperture 26. Further, the translational energy of the tons which can be analyzed by the quadrapole mass spectrometer 34 is known to be 5 to 15 eV. In the present embodiment, the potential of the first aperture 26 is 10V, so the translational energy of the ions of the $Li^+$ attached detected gas striking the quadrapole mass spectrometer 34 becomes 10 eV and normal mass spectrometry becomes possible.

The pressure in the space 11B from the second aperture 27 and containing the condensing lens 33 and the quadrapole mass spectrometer 34 is determined by the flow rate from the second aperture 28 and the pumping speed of the vacuum pump 37 evacuating the space 11B from the second aperture 28 to the quadrapole mass spectrometer 34 and is designed to become generally less than $10^{-3}$ Pa. Therefore, not only is the $Li^+$ attached detected gas prevented from striking the atmospheric gas, but also the quadrapole mass spectrometer 34 can be operated stably over a long period without contamination by the halide compound.

Figure 2:
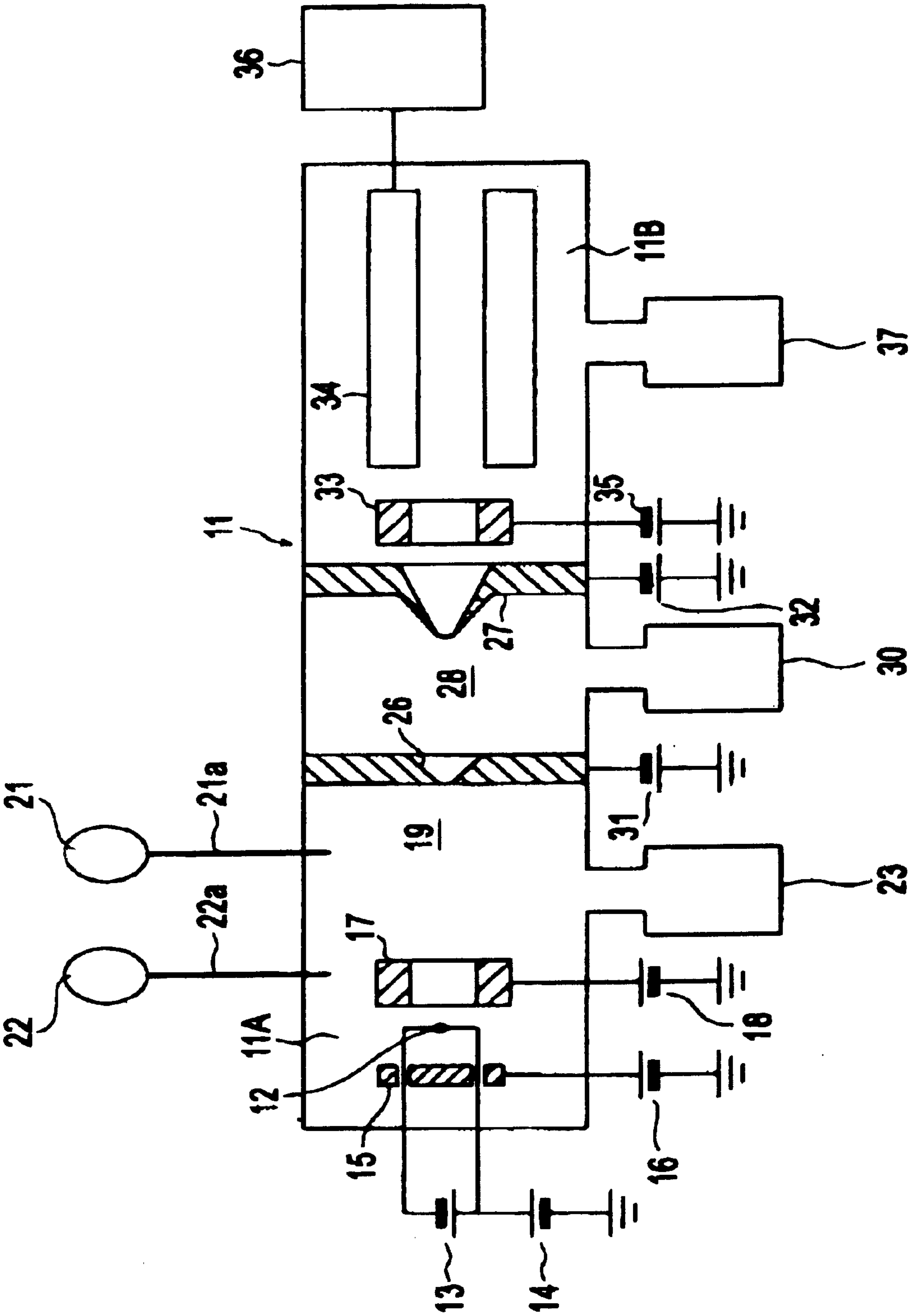
FIG. 2 is a view of the configuration of a second embodiment of the present invention.

Next, a mass spectrometry apparatus according to a second embodiment of the present invention will be explained with reference to FIG. 2. The mass spectrometry apparatus of this second embodiment is configured with the emitter portion and the reaction chamber integral. That is, the emitter placement region, $Li^+$ flight region, and reaction chamber explained in the first embodiment are made integral. Therefore, a reaction chamber is not specially provided. The rest of the configuration is the same as that of the first embodiment. Elements shown in FIG. 2 will be explained assigning the same reference numerals as with the elements explained in the first embodiment. In the left internal space 11A,2 the above-mentioned reaction chamber 20 and the related vacuum pump 25 etc. are eliminated. The sample gas source 21 and the $N_2$ gas source 25 introduce the sample gas and the $N_2$ gas directly into the $Li^+$ flight region 19 through the piping 21*a* and 22*a*. The conditions of the space etc. including the emitter 12, ropeller 15, emitter lens 17, and $Li^+$ flight region 19 are substantially the same as those explained in the first embodiment.

According to the above second embodiment, it is possible to eliminate the parts relating to the reaction chamber, so the hardware configuration can be simplied and the manufacturing costs can be reduced.

Figure 3:
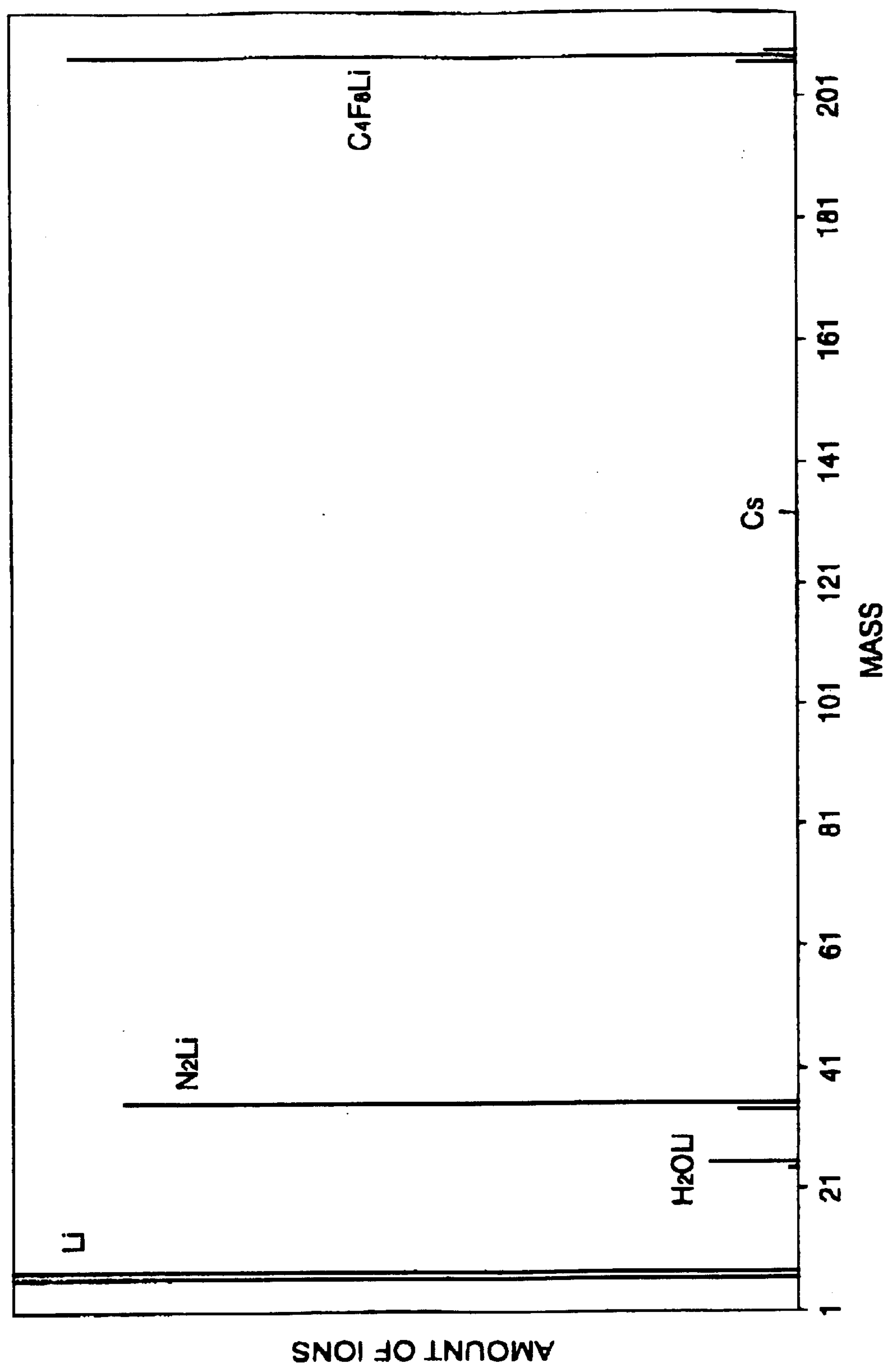
FIG. 3 is a view of an example of a mass spectrum obtained by the mass spectrometry method according to the present invention.
Figure 4:
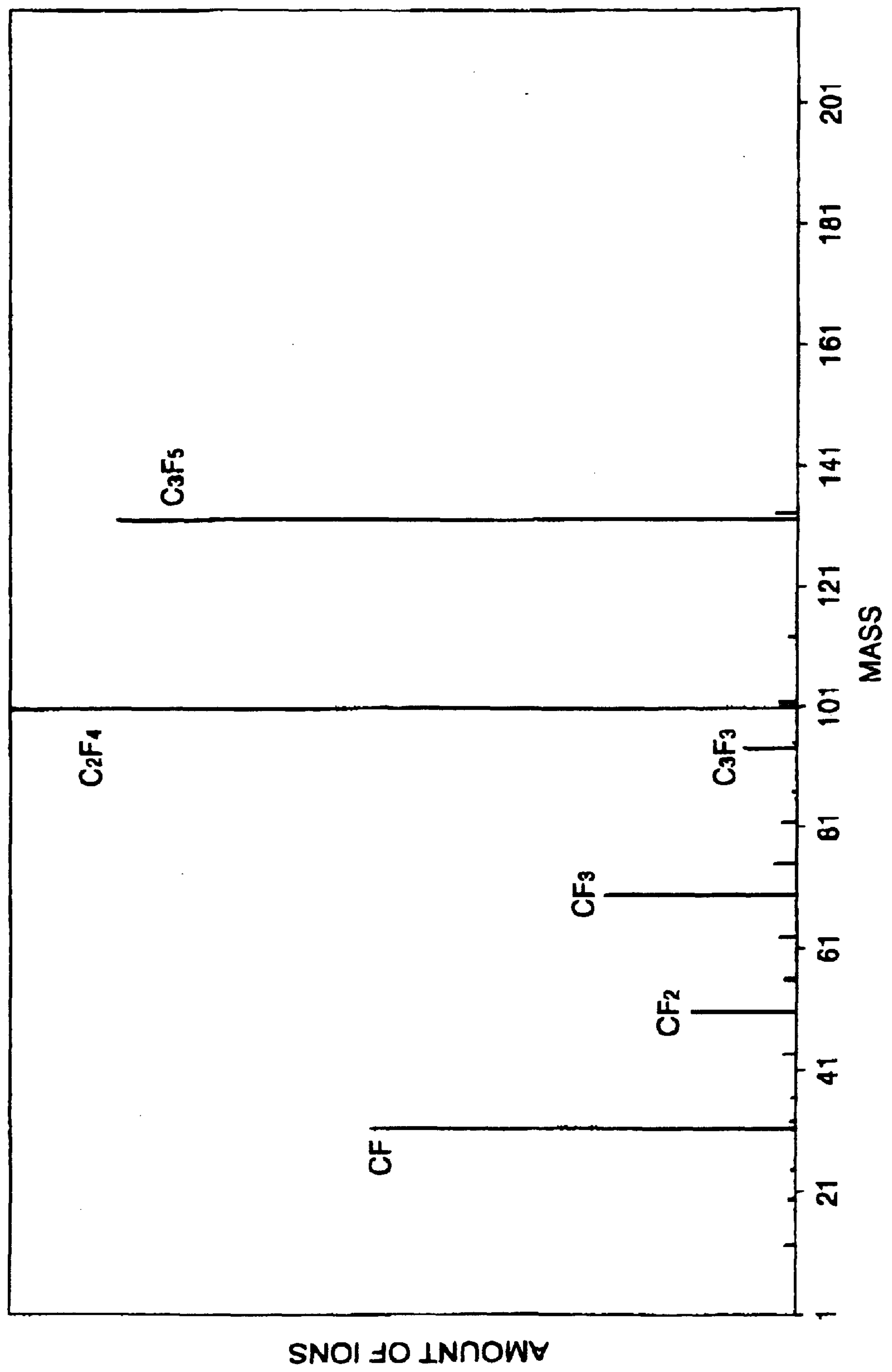
FIG. 4 is view of an example of a mass spectrum obtained by the mass spectrometry method of ionization by electron impact.

FIG. 3 shows the mass spectrum obtained as a result of a measurement test conducted using the apparatus according to the second embodiment of the present invention. In FIG.

3, the abscissa indicates the mass, while the ordinate indicates the amount of ions. In this measurement test, the detected gas was made $C_4F_n$ the cations were made $Li^+$, the pressure in the reaction chamber was made 133 Pa, and the inert gas was made $N_2$. In the obtained mass spectrum, only peaks of $C_4F_nLi^+$ (207 amu), $N_2Li^+$ corresponding to the molecule peak of $N_2$ (35 amu), $H_2OLi^+$ corresponding to the molecule peak of $H_2O$ included in the gas as an impurity (25 amu), and unattached $Li^+$ (7 amu) appear. That is, it was confirmed that even if using cation attachment mass spectrometry for a fluoride compound, the mass of the gas molecules of the detected gas is precisely measured without causing dissociation. Note that 133 amu is the Cs impurity contained in the emitter itself.

The above embodiments can be modified in the following way. In the above embodiments, the detected gas was made the representative PFC of $C_4F_8$, but the present invention is not limited to a PFC. It can also be applied to all fluoride compounds having a large electron affinity and other similar characteristics as with PFC such as $SF_6$-$NF_3$. Further, it may also be applied to all halide compounds having characteristics similar to a fluoride compound.

In the above embodiments, the main component of the atmosphere in the attachment region was made the most generally used $N_2$, but the present Invention is not limited to $N_2$. It may also be applied to He, Ar, Ne, $H_2$, etc. to which metal ions do not easily attach. Further, It may also be applied to any gas to which metal ions do not easily attach compared with the detected gas.

In the above embodiments, use was made of the lightest $Li^+$ as the metal ions, but the present invention is not limited to $Li^{30}$ . It is also possible to use as the metal ions the easily handleable $K^+$, $Na^+$, $Rb^+$, $Cs^+$, $Al^+$, $Ga^+$, $In^+$, etc. Further, it is possible to use any positive metal ions able to attach to a halide compound.

The numbers and arrangement of the gas feed piping and vacuum pumps in the present invention are not limited to those of the above embodiments. Any system can be used so long as the pressure in the metal ion flight region and attachment reaction region is at least 10 Pa, preferably at least 100 Pa. These pressures may also be pressures smaller than 10 Pa if in a range giving the necessary measurement performance. Further, if it is possible to promote direct ion attachment in the reaction region by electrical or magnetic conditions, the pressure condition in the reaction region may also be set to a low pressure smaller than 10 Pa. Further, in the above embodiments, use was made of a quadrapole mass spectrometer for the mass spectrometry method and mass spectrometry apparatus, buy the present invention is not limited to this. It is also possible to use an ion trap (3D) type mass spectrometer, magnetic field sector type mass spectrometer, TOF (time of flight) type mass spectrometer, etc.

According to the present invention, provision Is made of a mass spectrometry method and mass spectrometry apparatus applying Fujii system cation attachment to ionize gas molecules of a sample gas for mass spectrometry, so it becomes possible to ionize a fluoride compound or other halide compound by direct attachment without causing dissociation, it becomes possible to precisely observe a molecule peak of the halide compound being measured in the mass spectrum obtained by the mass spectrometry, and it becomes possible to precisely measure fluoride compounds etc. having a large impact on global warming.

While the invention has been described with reference to specific embodiment chosen for purpose of illustration, it should be apparent that numerous modifications could be made thereto by those skilled in the art without departing from the basic concept and scope of the invention.

What is claimed is:

1. A mass spectrometry method for a halide compound for measuring the mass of a detected gas being a halide compound. comprising:

directly attaching positive charge metal ions on said halide compound to ionize the same, and then measuring the mass of the molecules of said halide compound by utilizing electromagnetic force.

2. A mass spectrometry method for a halide compound as set forth in claim 1, wherein a main component of an atmosphere of a reaction region for the ionization is a gas to which said metal ions attach less easily than to said halide compound.

3. A mass spectrometry method for a halide compound as set forth in claim 2, wherein said main component is a gas selected from any of He, Ar, Ns, $H_2$, and $N_2$.

4. A mass spectrometry method for a halide compound as set forth in claim 2, wherein a pressure of an atmosphere of at least said reaction region is maintained at a predetermined high pressure by said gas forming the main component.

5. A mass spectrometry method for a halide compound as set forth in claim 4, wherein the pressure of the atmosphere of said reaction region is at least 10 Pa.

6. A mass spectrometry method for a halide compound as set forth in claim 3, wherein a pressure of an atmosphere of at least said reaction region is maintained at a predetermined high pressure by said gas forming the main component.

7. A mass spectrometry method for a halide compound as set forth in claim 1, wherein the pressure of the atmosphere of a region wherein said metal ions fly until striking said reaction region is at least 10 Pa.

8. A mass spectrometry method for a halide compound as set forth in claim 1, wherein said halide compound includes a carbon atom and a fluorine atom.

9. A mass spectrometry method for a halide compound as set forth in claim 1, wherein said metal ion is any of Li, K, Na, Rb, Cs, Al, Ga, and In.

10. A mass spectrometry apparatus for a halide, compound comprising:

an emitter for emitting metal ions.

a first gas source for feeding a detected gas being a halide compound, a reaction chamber where said detected gas is introduced and ionized by said metal ions, a second gas source for feeding to said reaction chamber a gas to which said metal Ions attach less easily than to said halide compound, an electromagnetic guide for guiding molecules of said ionized detected gas, and a mass spectrometer for measuring said molecules guided by said guide and wherein the metal ions emitted from said emitter are caused to fly to said reaction chamber to ionize said detected gas.

11. A mass spectrometry apparatus for a halide compound as set forth in claim 10, wherein said gas to which said metal ions attach less easily is any of He, Ar, Ne, $H_2$, and $N_2$.

12. A mass spectrometry apparatus for a halide compound as set forth in claim 11, further comprising a pressure adjusting means for adjusting an internal pressure of said reaction chamber to a predetermined high pressure, wherein the internal pressure of said reaction chamber is held at said predetermined high pressure.

13. A mass spectrometry apparatus for a halide compound as set forth in claim 10, further comprising a pressure adjusting means for adjusting an internal pressure of said reaction chamber to a predetermined high pressure, wherein the internal pressure of said reaction chamber is held at said predetermined high pressure.

14. A mass spectrometry apparatus for a halide compound as set forth in claim 13, wherein the internal pressure of the reaction chamber is at least 10 Pa.

15. A mass spectrometry apparatus for a halide compound as set forth in claim 10, wherein said gas is also fed to a region from said second gas source, where said metal ions fly until entering into said reaction region, and makes the pressure of said region at least 10 Pa.

16. A mass spectrometry apparatus for a halide compound as set forth in claim 15, wherein instead of providing said reaction chamber as a separate part it is configured by using a region of placement of said emitter, said flight region, and a reaction region corresponding to said reaction chamber as common regions.

17. A mass spectrometry apparatus for a halide compound as set forth in claim 10, wherein said halide compound includes a carbon atom and a fluorine atom.

18. A mass spectrometry apparatus for a halide compound as set forth in claim 10, wherein said metal ion is any of Li, K, Na, Rb, Cs, Al, Ga, and In.

* * * * *